(12) United States Patent
Park

(10) Patent No.: US 8,627,956 B2
(45) Date of Patent: Jan. 14, 2014

(54) SCREWSTRIP WITH DRIVE SLOTS HAVING ANGLED SIDEWALLS

(75) Inventor: Scott Park, Bethpage, TN (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 302 days.

(21) Appl. No.: 12/537,828

(22) Filed: Aug. 7, 2009

(65) Prior Publication Data

US 2010/0032326 A1 Feb. 11, 2010

Related U.S. Application Data

(60) Provisional application No. 61/086,999, filed on Aug. 7, 2008.

(51) Int. Cl.
*B65D 85/24* (2006.01)
(52) U.S. Cl.
USPC .......................................................... 206/345
(58) Field of Classification Search
USPC .................. 206/343–347, 338, 379
See application file for complete search history.

(56) References Cited

U.S. PATENT DOCUMENTS

| 3,904,032 | A | * | 9/1975 | Maier | 206/347 |
| 3,944,068 | A | * | 3/1976 | Maier et al. | 206/347 |
| 5,509,768 | A | * | 4/1996 | Hon | 206/347 |
| 6,832,696 | B2 | * | 12/2004 | Donner | 206/345 |
| 7,025,551 | B2 | * | 4/2006 | Haytayan | 206/346 |
| 2004/0089118 | A1 | | 5/2004 | Habermehl et al. | |

FOREIGN PATENT DOCUMENTS

| JP | 56106221 U | 8/1981 |
| JP | 2003314521 A | 5/2003 |

OTHER PUBLICATIONS

International Search Report and Written Opinion of the International Searching Authority dated Nov. 11, 2009 in PCT Application No. PCT/US2009/053171.

* cited by examiner

*Primary Examiner* — Andrew Perreault
(74) *Attorney, Agent, or Firm* — Vierra Magen Marcus LLP

(57) ABSTRACT

A screwstrip is disclosed including angled slots which allow a driver of an automated screwdriver to advance the screwstrip. The slots include a leading edge, which may be perpendicular to the line of travel of the screwstrip, and a trailing edge provided at an oblique angle with respect to the line of travel of the screwstrip. A slot including an angled sidewall is more forgiving and prevents misalignment of the driver with the slots.

15 Claims, 3 Drawing Sheets

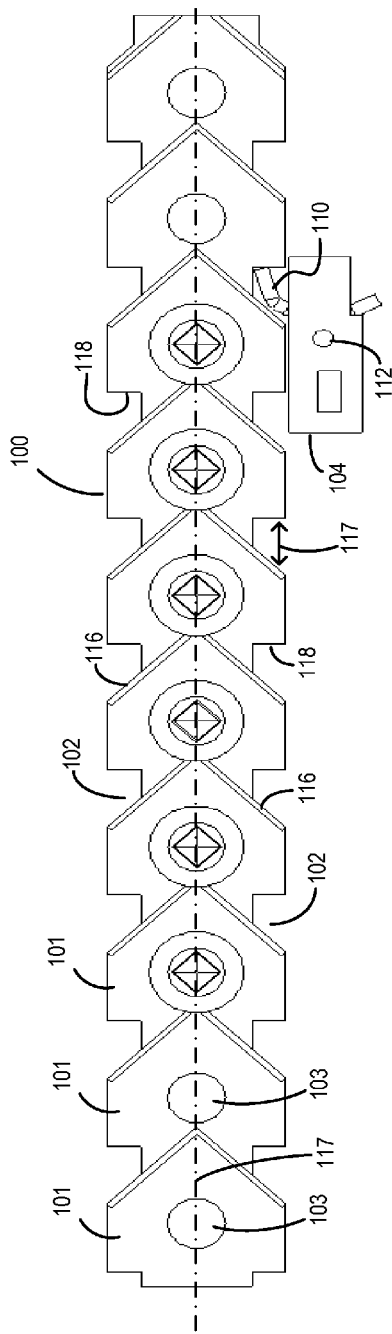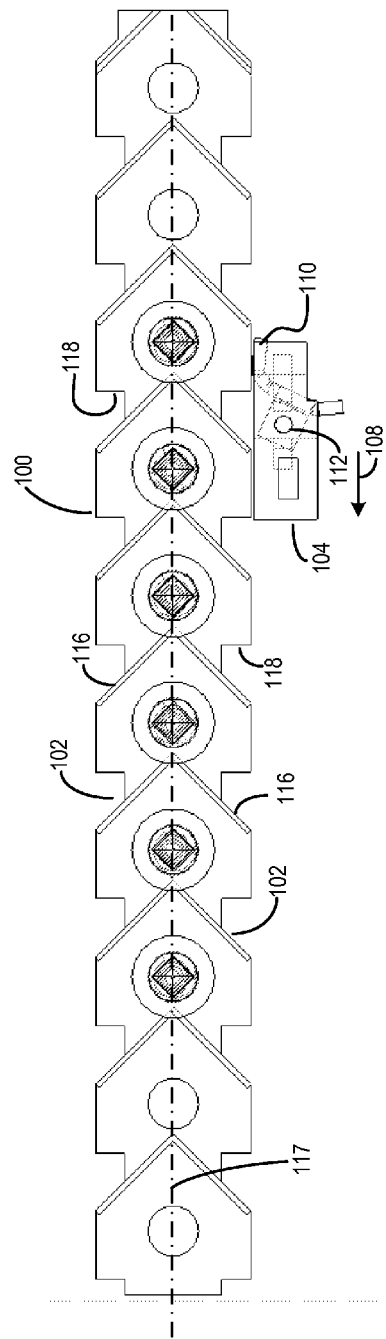

# SCREWSTRIP WITH DRIVE SLOTS HAVING ANGLED SIDEWALLS

CLAIM OF PRIORITY

The present application claims priority to provisional patent application No. 61/086,999, entitled, Screwstrip With Drive Slots Having Angled Sidewalls, to Scott Park, which application was filed on Aug. 7, 2008 and which application is incorporated by reference herein in its entirety.

BACKGROUND OF THE INVENTION

1. Field of the Invention

The present invention relates to a screwstrip for use in an autofeed screwdriver.

2. Description of the Related Art

Screwstrips are known wherein the screws are connected together by a retaining belt preferably of plastic material and adapted to be fed into an autofeed screw fastening tool and successively driven from the belt as the screwstrip is advanced through the tool. Known screwstrips of this type include those referred to and disclosed in the present applicant's U.S. Pat. No. 5,758,768, issued Jun. 2, 1998 and U.S. Pat. No. 5,927,163, issued Jul. 27, 1999, the disclosures of which are incorporated herein by reference. Such screwstrips are adapted to be driven in autofeed screwdrivers, such as taught by the applicant's U.S. Pat. No. 5,568,753, issued Oct. 29, 1996, U.S. Pat. No. 5,934,162, issued Aug. 10, 1999 and U.S. Pat. No. 5,870,933, issued Feb. 16, 1999, the disclosures of which are incorporated herein by reference.

Such screwstrips in one form are disposed in a helical coil containing, for example, up to 500 screws to be placed in a canister to retain the screwstrip and from which canister, a lead end of the screwstrip is placed into the autofeed screwdriver and advanced thereto to drive successive screws.

Collated screwstrips are known in which the screws are connected to each other by a retaining strip of plastic material. Such strips are taught, for example, by U.S. Pat. No. 4,167,229, issued Sep. 11, 1979 and its related Canadian Patents 1,040,600 and 1,054,982, as well as U.S. Pat. No. 4,930,630, the disclosures of which are incorporated herein by reference. Screws carried in such screwstrips are adapted to be successively incrementally advanced to a position in alignment with, and to be engaged by, a bit of a reciprocating, rotating power screwdriver and screwed into a workpiece. In the course of the bit engaging the screws and driving it into a workpiece, the screw becomes detached from the plastic strip leaving the strip as a continuous length.

Conventional automated screwdrivers include a driver for advancing a screw strip. It is typical that the driver includes a finger, or pawl, which engages within slots formed in the edge of the screwstrip to advance the screwstrip. Once a driver has advanced the screwstrip to its forwardmost position for a given cycle, a screw in the screwstrip is aligned with the screwdriver head and is inserted by the screwdriver into the workpiece. Thereafter, the driver moves rearward to engage the next screwstrip and advance the screwstrip to position the next screw for insertion.

Conventional screwstrips include rectangular slots that are engaged by the feed pawl of the driver. Given the precise timing that is required, a feed pawl may hit the tailing edge of a slot as the driver is still retracting. This can pull the screwstrip rearward and result in a misfeed of the screwstrip. Alternatively, the feed pawl may miss slot entirely.

SUMMARY OF THE INVENTION

Embodiments of the present invention relate to a screwstrip including angled slots which allow a driver of an automated screwdriver to advance the screwstrip. The slots include a leading edge, which may be perpendicular to the line of travel of the screwstrip, and a trailing edge provided at an oblique angle with respect to the line of travel of the screwstrip. A slot including an angled sidewall is more forgiving and prevents misalignment of the driver with the slots. In particular, having an angled rear edge of the slots prevents the pawl from striking the otherwise vertical rear edge found in conventional screwstrip slots. Additionally, the angled sidewall prevents the feed pawl from missing the slot altogether. The angled sidewall allows the feed pawl to enter each slot, whereupon the feed pawl engages the leading edge of each slot to advance the screwstrip to position the next screw for driving by the screwdriver.

BRIEF DESCRIPTION OF THE DRAWINGS

The present invention will now be described with reference to the drawings in which:

FIG. 1 is a top view of a screwstrip including angled slots with a driver engaged within a screwstrip slot;

FIG. 2 is a top view of a screwstrip including angled slots with a driver moving to the next slot and not engaged within a screwstrip slot;

DETAILED DESCRIPTION

Figure 3:
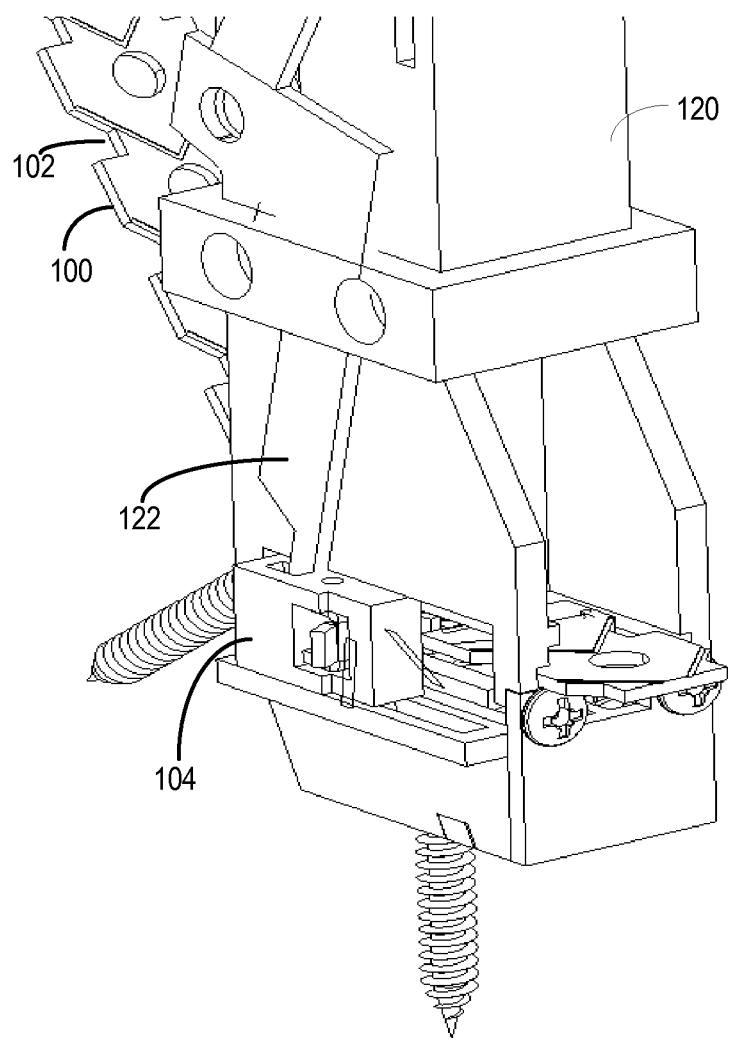
FIG. 3 is a perspective view of a screwstrip engaged within a screwdriver.
Figure 4:
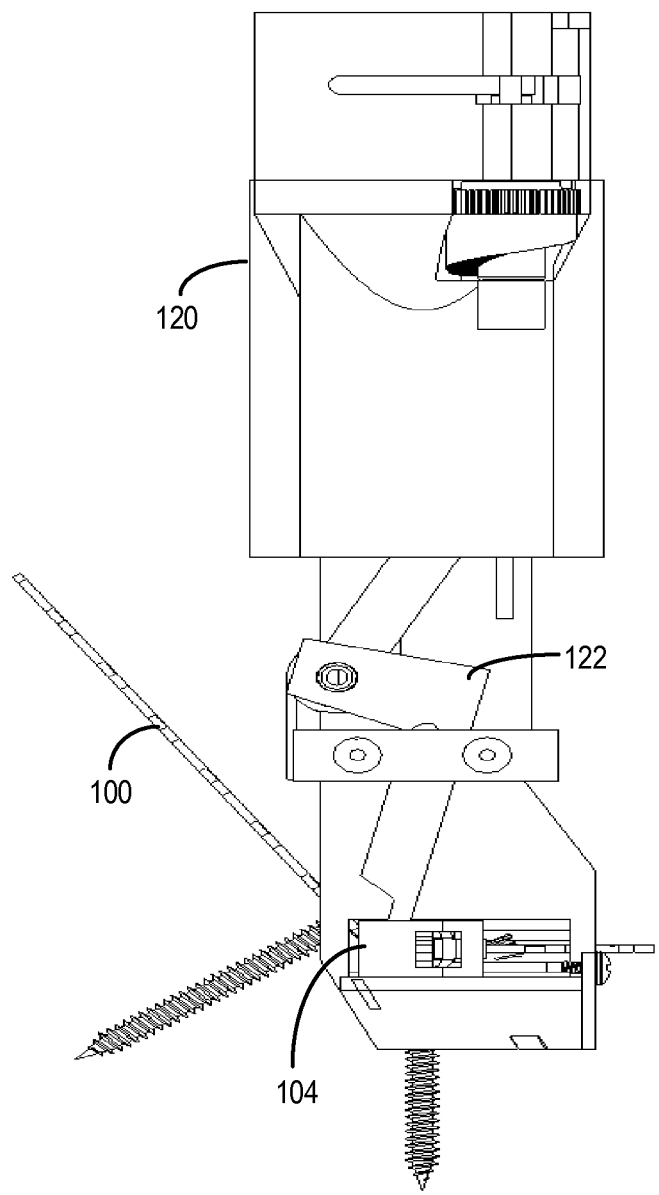
FIG. 4 is a side view of a screwstrip engaged within a screwdriver.

The present invention will now be described with reference to FIGS. 1 through 4, which in embodiments relate to a screwstrip for use with an autofeed screwdriver. It is understood that the present invention may be embodied in many different forms and should not be construed as being limited to the embodiments set forth herein; rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

FIG. 1 is a top view of a screwstrip 100 including a plurality of segments 101 (some of which are numbered in FIG. 1) each including a screw hold 103. Adjacent segments 101 define angled slots 102 which allow a driver 104 of an automated screwdriver 120 (FIGS. 2 and 3) to advance the screwstrip. In operation, once a driver 104 has advanced the screwstrip to its forwardmost position for a given cycle (as shown in FIG. 1), a screw in the screwstrip is aligned with the screwdriver head and is inserted by the screwdriver into the workpiece (not shown). Thereafter, a lever 122 on screwdriver 120 translates the driver 104 rearward in the direction of arrow 108, FIG. 2. At the same time, a feed pawl 110 pivots clockwise (from the perspective of FIGS. 1 and 2) around a pivot point 112 by a mechanism within driver 104 to retract the feed pawl 110 from the position shown in FIG. 1 to the position shown in FIG. 2. As the driver 104 retracts, the feed pawl 110 rotates counterclockwise to engage the next slot 102.

As indicated in the Background, conventional screwstrips include rectangular slots that are engaged by the feed pawl of the driver. Given the precise timing that is required, a feed pawl may hit the tailing edge of a slot as the driver is still retracting. This can pull the screwstrip rearward and result in a misfeed of the screwstrip. Alternatively, the feed pawl may miss slot entirely.

In accordance with the present invention, each slot 102 on one or both sides of the screwstrip 100 includes an angled trailing edge; that is, a trailing edge 116 that forms an oblique angle with an axis 117 of the screwstrip. A slot 102 including an angled sidewall is more forgiving and prevents misalignment of the driver 104 with the slots 102. In particular, having an angled rear edge 116 of the slots 102 prevents the pawl 110 from striking the otherwise vertical rear edge found in conventional screwstrip slots. Additionally, the angled sidewall 116 prevents the feed pawl 110 from missing the slot 102 altogether. The angled sidewall 116 allows the feed pawl to enter into a space 117 each slot 102, whereupon the feed pawl engages the leading edge 118 of each slot to advance the screwstrip to position the next screw for driving by the screwdriver 120.

The angle of rear sidewall 116 relative to the axis of the screwstrip may be anywhere between 30° and 60°, and may for example be 45°. It is understood that the angle may be less than 30° or greater than 60° in further embodiments. The angled slot 102 is shown on both sides of the screwstrip 100. In alternative embodiments, the angled slot 102 may be on only one of the sides of screwstrip 100. The other side may include no slots, or may include conventional rectangular slots.

In embodiments, the slot may be 0.85 inches deep (i.e., in a direction perpendicular to the axis of the screwstrip 100. It may have a length at its base of 0.115 inches and a length at its outer edge (i.e., at the out edge of the screw strip) of 0.200 inches. It is understood that these dimensions are by way of example only, and may vary above and below those given above in alternative embodiments.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A screwstrip for an automated screwdriver, the screwstrip including an axis along a length of the screwstrip and a width across the screwstrip, transverse to the length of the screwstrip, the screwstrip comprising:
   a plurality of segments, each segment including a screw hole centered across the width of the screwstrip; and
   a plurality of slots corresponding to the plurality of segments, each slot of the plurality of slots including a leading edge substantially perpendicular to the screwstrip axis, and a trailing edge forming an oblique angle to the screwstrip axis, the leading edge configured to be engaged by a feed pawl moving from a first position to a second position to advance the screwstrip, the angled trailing edge configured to allow the feed pawl to return to the first position without catching on the screwstrip.

2. The screwstrip recited in claim 1, wherein each segment includes a pair of slots, each slot in the pair having an oblique angle to the trailing edge of the slot.

3. The screwstrip recited in claim 1, wherein each segment includes a single slot.

4. The screwstrip recited in claim 1, wherein the trailing edge forms an angle of between 30° and 60° relative to the axis of the screwstrip.

5. The screwstrip recited in claim 1, wherein the trailing edge forms an angle of approximately 45° relative to the axis of the screwstrip.

6. A screwstrip for an automated screwdriver, the screwstrip including an axis along the screwstrip, the screwstrip comprising:
   a plurality of segments, each segment including only one screw hole; and
   a plurality of slots corresponding to the plurality of segments, each slot of the plurality of slots including:
      a leading edge provided at an angle relative to the axis of the screwstrip for receiving a feed pawl moving from a first position to a second position to advance the screwstrip,
      a trailing edge forming an oblique angle to the axis of the screwstrip axis to allow the feed pawl to return to the first position without catching on the screwstrip, and
      a space between the leading edge and the trailing edge, the space sized to receive the feed pawl therein, between the leading and trailing edge.

7. The screwstrip recited in claim 6, wherein leading edge is perpendicular to the axis of the screwstrip.

8. The screwstrip recited in claim 6, wherein each segment includes a pair of slots, each slot in the pair having an oblique angle to the trailing edge of the slot.

9. The screwstrip recited in claim 6, wherein each segment includes a single slot.

10. The screwstrip recited in claim 6, wherein the trailing edge forms an angle of between 30° and 60° relative to the axis of the screwstrip.

11. The screwstrip recited in claim 6, wherein the trailing edge forms an angle of approximately 45° relative to the axis of the screwstrip.

12. A screwstrip for an automated screwdriver, the screwstrip including an axis along the screwstrip, the screwstrip comprising:
   a plurality of screw holes positioned centrally with respect to a width of the screwstrip, the width being transverse to the axis of the screw strip;
   a plurality of segments, each segment including a single screw hole of the plurality of screw holes; and
   a plurality of slots corresponding to the plurality of segments, each slot of the plurality of slots including:
      a leading edge provided perpendicularly to the axis of the screwstrip for receiving a feed pawl moving from a first position to a second position to advance the screwstrip,
      a trailing edge forming an oblique angle to the axis of the screwstrip axis to allow the feed pawl to return to the first position without catching on the screwstrip, and
      a space between the leading edge and the trailing edge, the space sized to receive the feed pawl therein, between the leading and trailing edge.

13. The screwstrip recited in claim 12, wherein each segment includes a pair of slots, each slot in the pair having an oblique angle to the trailing edge of the slot.

14. The screwstrip recited in claim 12, wherein each segment includes a single slot.

15. The screwstrip recited in claim 12, wherein the trailing edge forms an angle of between 30° and 60° relative to the axis of the screwstrip.

* * * * *